2 Sheets—Sheet 1.

J. M. BOORMAN.
GEOMETRIC BLOCKS FOR MAPPING.

No. 185,889. Patented Jan. 2, 1877.

Witnesses:
Henry Eichling
H. Wells Jr.

Inventor:
J. Marcus Boorman
per James A. Whitney
Atty.

N. PETERS, PHOTO-LITHOGRAPHER, WASHINGTON, D. C.

2 Sheets—Sheet 2.

J. M. BOORMAN.
GEOMETRIC BLOCKS FOR MAPPING.

No. 185,889. Patented Jan. 2, 1877.

Witnesses:
Henry Eichling
H. Wells Jr.

Inventor:
J. Marcus Boorman
per James A. Whitney
Atty

N. PETERS, PHOTO-LITHOGRAPHER, WASHINGTON, D.C.

UNITED STATES PATENT OFFICE.

J. MARCUS BOORMAN, OF NEW YORK, N. Y.

IMPROVEMENT IN GEOMETRIC BLOCKS FOR MAPPING.

Specification forming part of Letters Patent No. 185,889, dated January 2, 1877; application filed July 26, 1876.

*To all whom it may concern:*

Be it known that I, J. MARCUS BOORMAN, formerly of Scarborough, in the State of New York, but now of the city, county, and State of New York, have invented certain Improvements in Geometrical Solids for Mapping and other Purposes, of which the following is a specification:

This invention comprises a system of new and useful geometrical solids, other and distinct from those commonly termed "the five platonic bodies" and their compounds — my said novel system of solids being more especially adapted for illustrating the science of solid geometry and mathematics as applied to mapping and other utilitarian purposes, and also to some extent for ornamental uses.

Figure 1:
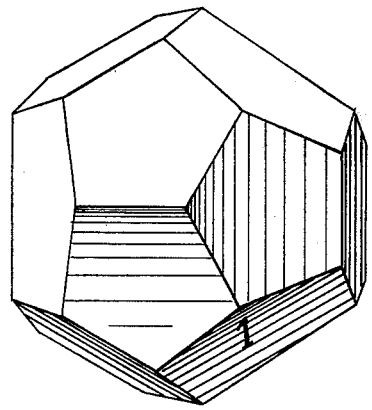
Figure 2:
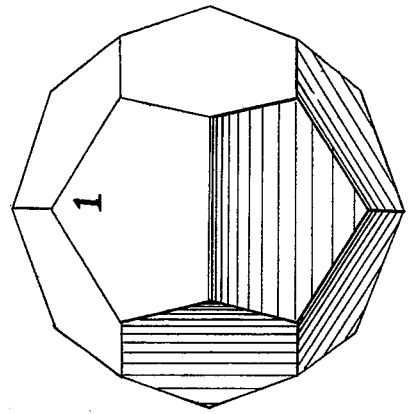
Figure 3:
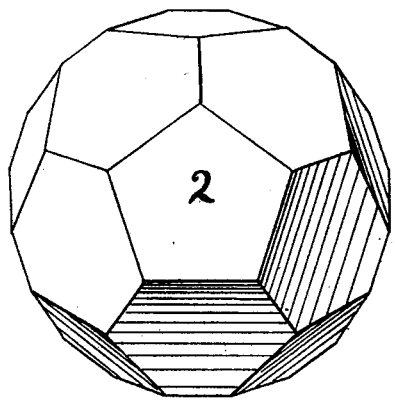
Figure 4:
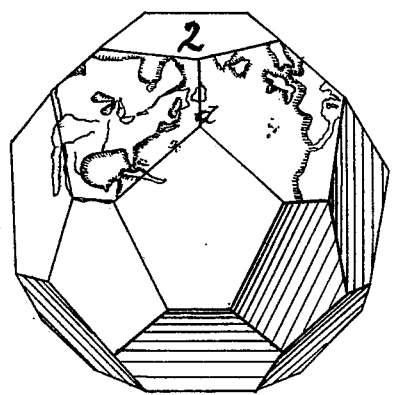
Figure 5:
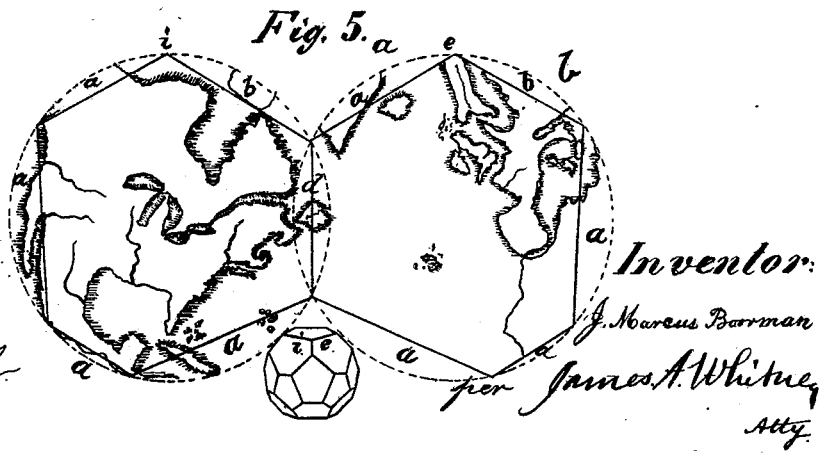
Figure 6:
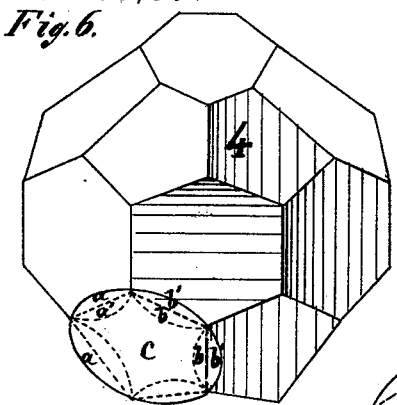
Figure 7:
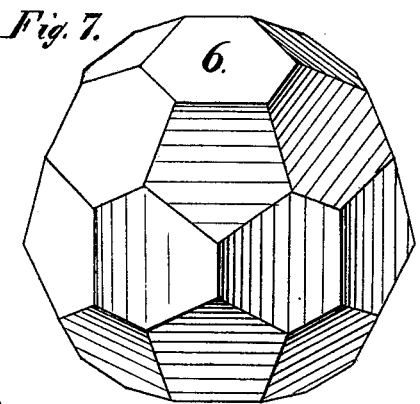
Figure 10:
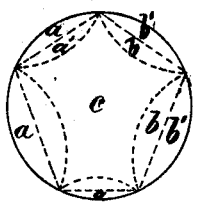
Figure 8:
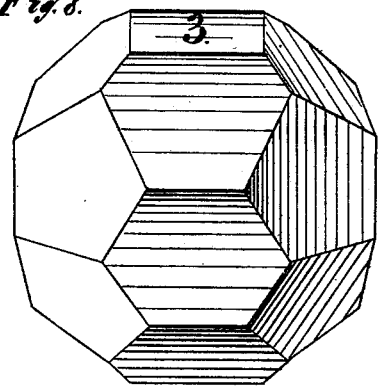
Figure 9:
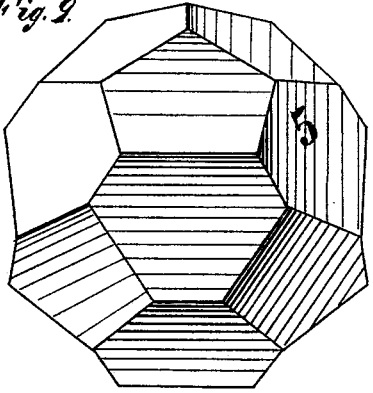
Figure 11:
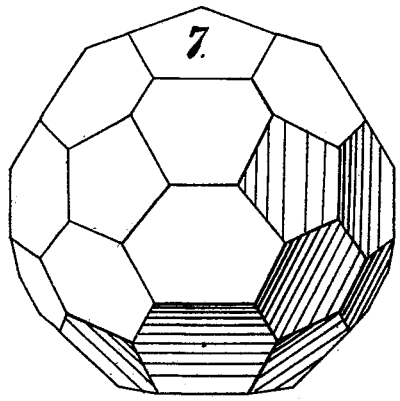

Figures 1, 2, 3, 4, 7, 8, 9, and 11 are perspective views of the novel solids embraced in my system aforesaid. Fig. 5 is a diagram illustrating the application of the system to mapping. Fig. 10 is a diagram illustrating the relations of the plane surfaces of the solids of my system to the surface of an ordinary sphere; and Fig. 6 is a perspective view of one of the solids of said system, with an auxiliary diagram, showing the relation of the plane surface thereof to the surface of a sphere of the same diameter.

The practical application of my aforesaid system of geometrical solids is based on my discovery of the existence and use of a group of nearly regular symmetrical solids having more than twelve faces each. To divide the surface of a sphere into areas for equal maps as little distorted as may be, and to determine their number, scale, and relative positions, and the contents of each, and to show how the parts to be transferred to the map may be marked out on the sphere, and to furnish maps of different scales and relative contents, are the properties of my said invention, because that in my system aforesaid every solid is capable of being inscribed in a sphere, or substantially so, out of which the solid may be cut, and the surface of which contains in imagination all the angles of the solid, every face of the solid being capable of being inscribed in equal intersecting circles all lying on the surface of the sphere; and upon the use of the forms and relative positions of those faces for the maps, either by themselves, or along with and including their overlapping parts or segments, as at *a a*, &c., Figs. 5, 6, 10, of their circumscribing circles, whose peripheries contain all the angles, each of its respective faces, which circles in any one solid are equal, or substantially so, and will all lie intersecting each other, either three or more at each several angle of the solid, and may be drawn upon the surface of the circumscribing sphere at the proper radius, which radius is fixed and unchangeable in every case for each solid, thus at once fixing and marking each face's place thereon for any given sphere, so that figures in curved lines resembling and corresponding to the faces may readily be drawn upon that surface which will indicate the portion of it to be transferred to the corresponding parts of the required maps, each of which may represent one face only of the solid, or that face and its circumscribing circle, as shown in solid No. 5, Fig. 6, at *a a b*, or a somewhat larger concentric circle and its inclosed space. In the two latter cases each map will overlap its adjoining maps by double these circular segments, as at *b b*, Figs. 6 and 10, so that each outside segment, as at *a* and *b'*, Figs. 6 and 10, together with the like inside segment, as at *a' b*, Figs. 6 and 10, will again be represented in duplicate on the next map on that side, and so on through all the maps, but with reverse effect as regards foreshortening, the part unduly expanded by transfer from the curved surface in the one case being contracted in the other, so that on comparison the two maps, in great part, correct each other to the eye, and the true proportion of parts can be readily estimated, as well for the unduplicated central parts, as at *c*, Figs. 6 and 10, as for the segments in question, by making the proper mental allowance in each case, according to distance from the center should great accuracy be desired, the principal use of said maps being the correct representation of the surface of the earth or of the heavens, whereby, because all of the maps in any one series are on one and the same scale, and that each series represent all the faces of the solid employed to form it by as many maps of a circular character as that solid has faces, (except where two or more maps may be joined in one, as at *d*, Figs. 4 and 5, or where one or more maps of parts not desired to be represented may be left out,) and, further, because the foreshortening of the curved surface, as represented in less and better compensated, by reason of the greater number, more regular arrangement, circular character, and overlap of the maps, as above stated, therefore the relative sizes, forms, and positions of districts or places on a sphere are much more perfectly shown by the maps formed as herein described than in any ordinary method of mapping, or than can be obtained by the division of the spherical surface into twelve or any less number of equal maps, or than by any existing map or series of maps, and whereby also the relative situations on the sphere of any two or more maps whatever of the same series may be readily recognized by simply printing on the sheet with each map a small figure of its basal solid with suitable letters of reference.

The relative arrangement of the faces varying somewhat in these solids, even when nearly of the same number of faces, there will be a preference of one over the rest for special purposes. The docosahedron is preferred for maps of the earth, because North America is as advantageously shown in one map as it could be by a map of much larger extent, and with Europe in the next adjoining map in juxtaposition with Newfoundland and Greenland, as shown at *d*, Fig. 5; and the quindecahedron is preferred for the heavens, as presenting the greatest amount of surface in any one map compatible with moderate foreshortening. The dotriacontahedron will give rather more than double the scale of this last, and the heptriacontahedron will serve for a near double of the docosahedron. In the use of maps formed from these last two, with maps formed from either of the preceding solids, only a few maps need be given on the enlarged scale to show those objects or places only that are of special interest.

The said new solids embraced in my system and its application may be more particularly described as follows, to wit:

First. A solid (herein named the "quindecahedron") having fifteen plane faces, whose circumscribing circles are of about thirty-two degrees radius of a great circle upon its circumscribed sphere, having three kinds of faces, six pentagonal, alike and equal, with unique angles, that are grouped three and three together at that angle in two solid angles, that form the poles, a second six equal and like pentagons, differing from the first, also having unique angles, which occupy, three toward each pole, the spaces between the divergent sides of the first three, but with their bases together in pairs upon the equator, and lining with it, leaving three intervening spaces, which are accurately filled by three hexagonal-like equal faces upon and bisected by the equator. A close similarity will be noted between the arrangement and figures of the last two kinds of faces and those called herein third and fourth kinds in the heptriacontahedron, the former—three in number—alternating with three bases, and the latter five alternating with five bases on the equator. Other typical resemblances will suggest themselves in all these bodies. This solid is inscriptible in a sphere having twenty-six solid angles at the surface thereof, or nearly so, as some of the angles appear to fall imperceptibly short, and all its faces inscriptible in equal circles, or substantially so, which lie and intersect on that spherical surface, or substantially so. Secondary, but unlike, poles with respect to each other may also be taken at the center of either hexagon for the one pole, and the reverse pole will be at the center of the joint base, uniting two of the second kind of pentagons, as by Figs. 1 and 2 will more fully appear. From the nature of the case, the description of this and the following bodies can only be verified by mathematical computation, which is, in these cases, exceptionally long and laborious. The next body of twenty-two sides has been so verified by a calculation occupying parts of several days, and the radial angle twenty-seven degrees, forty-eight minutes, and thirty-six seconds found true, with a probable error of less than one-third of a second; and whether the present is a truly-inscriptible solid, only computation can show.

Second. A solid (herein called the "docosahedron") of forty solid angles and twenty-two faces of three kinds, the radius of whose equal circumscribing circles is twenty-seven degrees, forty-eight minutes, and thirty-six seconds of a great circle of its circumscribing sphere, from which it may be cut, and which contains, accurately, all its solid angles, with two faces of the first kind, which are regular pentagons, centered at either pole, but in reverse direction, the points of each face being opposite the centers of the sides of the other, and vice versa, ten equal like hexagons for the second kind, five about each polar pentagon, with their upper sides (as regards their respective nearest poles) coincident with its sides, and their next two sides each coincident with a corresponding side of its next hexagonal neighbor, and the angular space left between each two adjoining hexagons of either five by the spread or flare of two of their remaining sides, one on each side of each face taken with the like side of the next adjoining face, is filled accurately by the unique angle of one of the ten faces of the third kind, taken five and five, pointing toward either pole, which faces are all symmetrical, equal, and like pentagons, having their bases opposite a unique angle, and all their corresponding sides and angles on either side of that base alike, so that, being and lying five and five in opposite directions, with their upper sides accurately inclosed by and between the hexagons, their remaining sides other than the base coincide, each with the corresponding side reversed in the next adjoining face, the whole two fives thus being interlocked with their bases in opposite directions, which bases also accurately coincide with the remaining sides or bases of the hexagons, each to each, respectively, completing the solid. Other poles may be taken in the center of any face whatever for the one pole, and the opposite pole will always be at the center of a like and equal face, but in reverse, as in the poles above described, in which, as in some other respects, this is the most regular and symmetrical solid, except the platonic bodies, as by Figs. 3 and 4 will more fully appear.

Third. Another new solid, (herein called, to distinguish it from the last-named, the "duo-icosahedron," also having forty solid angles and twenty-two faces, but of four kinds, the first two, opposite squares, centered at the poles; second, eight equal like hexagons next adjacent, four against and conterminous as to one side, with a side of the square each to each, and two of their remaining sides each coinciding with a like side of its next adjoining hexagons; third, four equal like hexagons, more symmetrical than the last, centered upon, and bisected by, the equator, at equal distances from each other through two of their opposite equal angles, with their outermost sides on either side thereof at one with the lowermost sides or bases (reckoning from either pole) of the last-named hexagons, respectively, each to one of each, thus forming two bands of faces encircling the solid, and crossing each other at right angles at each pole, leaving four intervening spaces accurately filled by, fourth, eight symmetrical pentagons with unique angles, locked and contained accurately between the second sets of like sides of the eight circumpolar hexagons, pointed four and four toward the opposite poles, with their bases opposite those angles lying together in pairs at one in line with the equator, completing the solid, which has all its faces truly inscriptible in equal circles, with all its solid angles at the surface of a sphere, upon which those circles will truly lie and intersect, with a radius of about twenty-seven and one-half to twenty-eight degrees of its great circles. Other poles may also be taken, as by solid 3, Fig. 8, will more fully appear.

Fourth. A solid (herein called the "tricosahedron") of forty-two solid angles and twenty-three (divisible into three) kinds of faces—viz., two regular heptagons, centered at poles, next fourteen symmetrical pentagons, next adjoining seven, and seven with their bases at one with the respective sides of the heptagons, and, third, seven symmetrical hexagons—all centered upon, and together forming an unbroken band upon and bisected by, the equator, which also bisects a pair of sides of each, and around the whole of it the pentagons, linking in on either side into the angles formed by their remaining pairs of sides, thus completing the solid, which is so nearly (though it would seem not quite accurately) inscriptible in a sphere with faces in equal circles of a radius of about twenty-seven degrees that it is equally useful with others for practical purposes, all which, by Fig. 6 of solid 4, will more fully appear.

Fifth. A solid (herein called "tetracosahedron") of forty-four solid angles and twenty-four faces of four kinds, viz: first, six pentagons of one unique angle each, grouped three and three at the respective poles by those angles; second, six hexagons of two unique angles each, of which a corresponding angle in each lies with its sides in one of the angular openings between the pentagons, three and three north and south of the equator, so to speak; third, six hexagons of paired angles, whose polarward sides are at one with the bases of the first pentagons, three and three toward each pole, and whose opposite sides or bases are also at one in three pairs at and in line with the equator, thus constituting three bands of faces, four in each, between the angular poles, whose upper angles and openings poleward both ways are filled by the first-named hexagons; and, fourth and lastly, six pentagons of one unique angle unlike the first kind, lying base to base upon, and bisected by, the equator, in pairs, with their bases or sides opposite their unique angles in one, and also so bisected, and these pairs severally filling accurately the three remaining openings between the before-mentioned bands, and completing the solid, which is inscriptible in a sphere, and its faces inscriptible in circles of about twenty-seven degrees of its great circles. Other but not like poles exist at the centers of the sides, lining with as opposed to those crossing the equator, all which, by reference to solid No. 5, Fig. 9, will more fully appear.

Sixth. A solid (herein called the "dotriacontahedron") of sixty solid angles and thirty-two faces of two kinds—viz., twenty like equal hexagons, each of three larger and three smaller equal sides, alternating a large and then a small side around each face, and twelve regular pentagons—all these faces truly inscriptible in equal circles of a radius of about twenty-three and a half degrees of a great circle of the sphere in which the solid may be inscribed, and which will contain at its surface all the solid angles of this solid lying truly at the intersections of those circles. The center of any face being taken for a pole, another like face (but reversed) will be centered at the reverse pole, and when two hexagonal faces are centered at the poles a band of six faces—three hexagons and three pentagons, alternating—will surround each, the pentagons joining the polar faces at the larger and the hexagons at their smaller sides, and next to these bands, one adjoining each, two bands of nine faces each will meet, with mutually interlocked angles and faces at the equator, and complete the solid, these last-named bands each consisting of three equidistant pentagons, alternating with six hexagons in three pairs, each pair joined at a smaller side, and having a larger side at each face at one with a side of a pentagon.

Seventh. A new solid (herein styled the "heptriacontahedron") of seventy solid angles and thirty-seven faces, all inscriptible in equal circles of about twenty-two and a half degrees radius, and of five kinds, viz: first, two regular pentagons, centered at either pole, each with its corresponding sides exactly opposite those of the other at the reverse pole, and each pair of those sides connected by one of five bands of four intervening faces each, the first adjoining faces of which toward either pole being of ten hexagonal faces of the second kind, each having its most polarward side at one with a side of its adjoining polar pentagons, and its side opposite or equatorward at one with a polarward side of one of ten other hexagonal faces of the third kind, the same lying in pairs, and having their respective sides, which are opposite the last named, at one in each pair, and upon, and lining with, the equator, thus completing the five bands of four faces each, the five polarly-elongated spaces left between them being accurately filled, each by three faces—viz., one of five nearly regularly hexagonal of the fourth kind lying upon, and bisected through, two like angles by the equator, flanked by two, one on either polarward side of ten equal like nearly regular pentagons, the fifth kind of face, the one unique angle of each accurately filling its respective polarward angle of one of the said polarly-elongated spaces, and the base or side opposite to that angle being at one with the adjoining side of the hexagon flanked by it, thus completing the solid, which is inscriptible in a sphere, and may have other but not like poles, one of which being taken at the center of a hexagon of the fourth kind, the reverse pole will be at the center of a side lying on the equator, as above taken, all of which, by solid No. 7 and Fig. 11, will more fully appear.

In order to form the maps, poles and an equator may be found on the sphere, and a circle of the required radius, as herein given, or which may be computed, (and found to any required accuracy for any solid to be used,) marked around each pole, and its periphery divided into parts of the same proportionate lengths and corresponding positions with the sides of the polar face, by which, at same radius, may be drawn other circles intersecting at those distances, and also elsewhere beyond, which outer intersections will furnish means to draw yet other circles, and so on until the intersections are found for the whole sphere corresponding to the solid angles of the required solid. If desired, new poles may then be easily marked on the sphere, with their equator, meridians, &c., and the portions to be mapped brought to any required position upon the faces of the solid lying between those, its solid angles, and may be accurately transferred to a flat surface or map by any suitable process. Where a solid angle forms a pole, the circles there intersecting may be drawn at once, and their outer intersections will enable the next to be drawn, and those the next, and so on, as before.

What I claim as my invention is as follows:

1. The solid herein called and described as the quindecahedron, the same consisting of a geometric solid figure having fifteen plane faces and twenty solid angles, as and for the purposes herein set forth and described.

2. The solid herein called the docosahedron, the same consisting of a figure having twenty-two plane faces and forty solid angles, as and for the purposes set forth and described.

3. The solid herein called the duo-icosahedron, of twenty-two plane faces and forty solid angles, as and for the purposes herein set forth and described.

4. The solid herein called the tricosahedron, of twenty-three plane faces and forty-two solid angles, as and for the purposes herein set forth and described.

5. The solid herein called the tetracosahedron, of twenty-four plane faces and forty-four solid angles, as and for the purposes herein set forth and described.

6. The solid herein called the heptriacontahedron, of thirty-seven plane faces and seventy solid angles, as and for the purposes set forth and described.

7. A group or class of solids, each of more than twelve plane faces, no more than three of which shall meet in any one and the same point, and each of its faces accurately, or substantially so, inscriptible in equal circles, the whole inscriptible, or substantially so, in a sphere, as and for the purposes herein set forth and described.

8. The system or set of solids herein specifically described, as and for the purposes set forth.

J. MARCUS BOORMAN.

Witnesses:
HENRY EICHLING,
H. WELLS, Jr.